United States Patent Office 3,267,501
Patented August 23, 1966

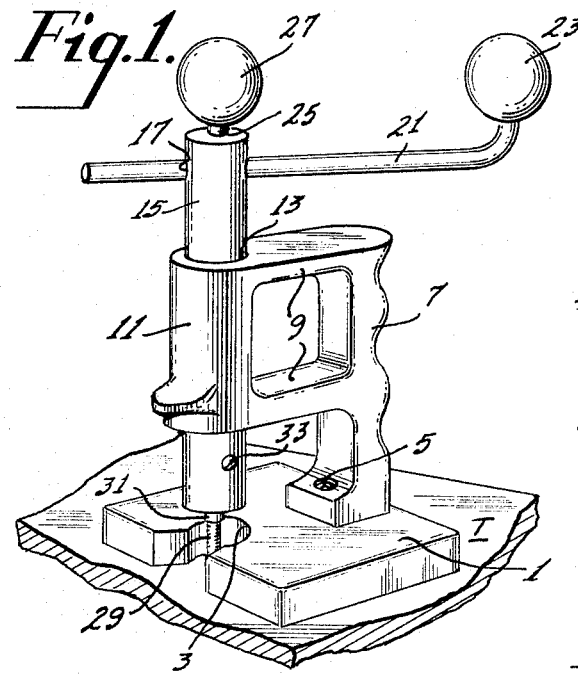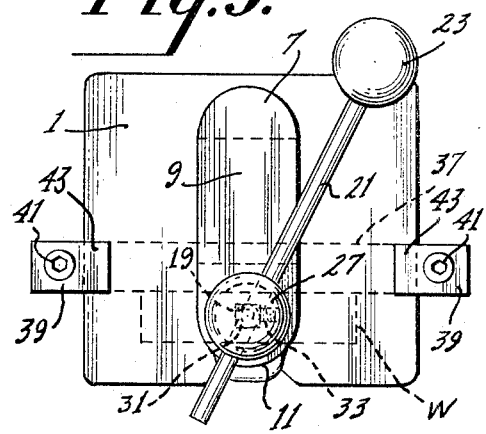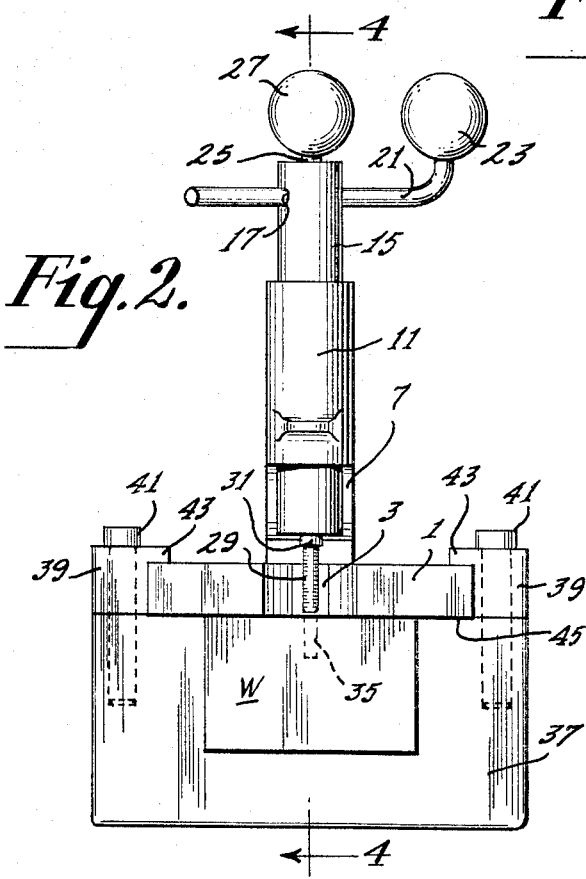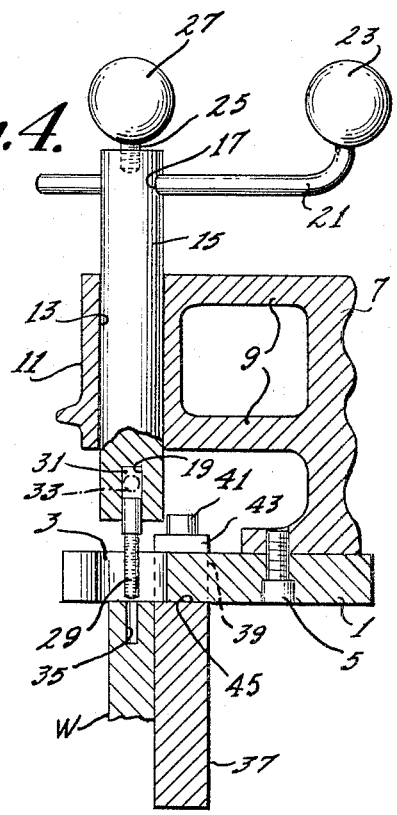

3,267,501
MANUALLY OPERABLE MACHINE TOOL
Theodore M. Wright, 934 Haddon Ave., Camden, N.J.
Filed May 20, 1964, Ser. No. 368,923
1 Claim. (Cl. 10—129)

This invention relates to manually operable machine tools for performing mechanical operations on a workpiece, and more particularly to a portable, hand operated tool for performing such operations on a workpiece as tapping, reaming or countersinking a hole with accuracy, especially in the case of small workpieces.

Various tools have been proposed heretofore for reaming and/or tapping holes in work. Assuming that a hole to be tapped or threaded has been drilled square with the surface from which it leads, if the tap is not started square (i.e., with its axis at a right angle to such surface), the resulting threads will not be square, since the tap will not follow the hole accurately. Unless the tap follows the hole accurately, it will cut a heavier or deeper thread on one side of the hole than on the diametrically opposite side, and the resulting side pressure will often break the tap if the hole is relatively deep. Even if the tap is not driven hard enough to break, the excessive side pressure against the tap will cause excess wear on the tap and render it useless after a short period of use.

Starting a tap square with the surface is difficult unless some sort of guide is provided to insure the square or right angle relation with the surface of the work. This is especially true of a plug or bottoming tap. Here, a taper tap must frequently be used first to start the thread. In such cases, two operations must generally be used to complete the threading or tapping. To insure proper relation between tap and hole, tapping machines and tools of various types have been provided in the past, some of them, such as bench tools and console type machines, being quite complicated and expensive. To avoid the expense of such machines, there have been provided fairly simple tap wrenches, but such wrenches lack the desired accuracy. In using such wrenches, especially in small diameter holes, care must be taken to turn the wrench evenly about its axis since side pressure on the wrench will more than likely cause the tap carried thereby to snap or break. With larger diameter taps, the taps may not break, but uneven pressure will result in a threaded hole in which a screw would have a sloppy fit.

The primary object of the present invention is to provide an inexpensive hand operated machine tool for performing tapping and reaming operations, and which is free from the foregoing and other known disadvantages of prior art tapping and reaming tools.

More particularly, it is an object of this invention to provide an improved, simple, hand operated machine tool as aforesaid by means of which a hole can be reamed and/or tapped with great accuracy.

Another object of this invention is to provide an improved, hand operated machine tool as set forth which is especially adapted for operating on small work pieces.

A further object of this invention is to provide an improved hand operated machine tool which can be either applied to the work for operation thereon, or to which the work can be applied, and in either case, holes in the work can be reamed and/or tapped very accurately.

Still another object of this invention is to provide an improved hand tapping machine tool which simulates hand tapping wrenches, but which will insure proper tapping of holes.

It is also an object of this invention to provide an improved hand operated machine tool as set forth above which is very simple in construction, easily portable, inexpensive in cost, and highly efficient in use.

In accordance with this invention, one form of hand tool comprises a base plate to the upper surface of which is secured a hand grip having a portion provided with a longitudinal, vertical bore in alignment with a hole in the base. In the bore, an arbor or spindle which carries a tap or other tool at its lower end is mounted for free rotation and sliding movement therein. Secured to the arbor adjacent to its upper end is a crank handle by means of which the arbor can be rotated. Mounted on the base plate and adjustable thereon from front to back is a gauge plate against which a workpiece can be held while supported either on the upper surface of the base plate or against the lower surface thereof. The base plate, itself, can either be placed on a work table and clamped thereto, or it can be clamped in a vise, and the workpiece can be located accurately against either the upper surface or the lower surface of the base by means of the gauge plate. If desired, the base plate can also be placed directly on the workpiece and either clamped thereto or held thereon by hand pressure applied through the hand grip. In any case, with the base plate and the workpiece in firm engagement with each other and the workpiece against the gauge plate (the latter, of course, having been adjusted on and secured to the base plate in a position such that, when the workpiece is disposed against it, the hole in the workpiece which is to be tapped or otherwise operated on is aligned with the tap or other tool on the arbor), the arbor can then be turned to effect the necessary operation with great accuracy.

The novel features of the invention, both as to its organization and method of operation, as well as additional objects and advantages thereof, will be more readily apparent from the following description, when read in connection with the accompanying drawing in which FIGURE 1 is a perspective view of one form of machine tool according to this invention, the tool being shown with its gauge plate removed and resting on a bench top, FIGURE 2 is a front elevation of the tool with its gauge plate mounted on the base and a small workpiece disposed against the lower surface of the base and against the gauge plate, FIGURE 3 is a top plan of the tool shown in FIGURE 2, and FIGURE 4 is a sectional view taken on the line 4—4 of FIGURE 2, looking in the direction of the appended arrows.

Referring in greater detail to the drawing, there is shown a hand operable machine tool having a base plate 1 the top and bottom surfaces of which are parallel to each other and which has leading from the front edge thereof a V-slot terminating in a hole 3 through the plate. The hole 3 should be of a diameter appreciably larger than that of the largest diameter tap, reamer, bit or the like to be used in the tool. Secured to the base 1, as by means of a screw 5, in front to back alignment with the hole 3, is a hand grip 7 having a pair of forwardly extending, spaced, horizontal arms 9 which overlie the base plate 1 and terminate in a vertical bearing member 11 in substantial axial alignment with the hole 3. The bearing member 11 has a vertical bore 13 therein which is formed accurately with respect to the parallel top and bottom surfaces of the base plate 1 (i.e., with its axis perpendicular to such surfaces). An arbor or spindle 15 is mounted for free slidable and rotatable movement in the bore 13. The spindle 15 has a horizontal hole 17 diametrically therethrough near its top and a vertical bore 19 extending axially therealong from its lower end.

A crank arm 21 having an operating knob 23 thereon extends slidably through the hole 17 and is locked to the arbor or spindle 15 in any desired position of adjustment by a set screw 25 which may be set in a second knob 27 for ease of operation of the set screw. An operating tool 29, such as a tap or other suitable cutting tool (for example, a reamer, a bit, a countersink or the like), has a shank 31 which is received in the bore 19, the tool being locked to the arbor 15 in substantial axial alignment with the hole 3 in the base 1 by a set screw 33. It will now be apparent that when the tool 29 is a tap, and the tap is placed within the hole 35 in a workpiece W and the arbor 15 is rotated within the bore 13 by means of the crank 21, the tap will cut a thread in the hole 35. Since the bore 13 is formed accurately with respect to the base plate 1, and the tap 29 is similarly accurately mounted on the arbor 15, the resulting threads will be formed accurately in the hole 35; and if the tap should be a bottoming tap, no taper tap is necessary in advance of the bottoming tap.

The workpiece W can be placed either on the upper surface of the base plate 1 or against the lower surface thereof, as is most convenient. In either case, and especially where the workpiece is of small size, it is preferable to employ a gauge against which the workpiece W can be held to insure proper axial alignment between the hole 35 therein and the tap or other similar operating tool 29 while the cutting operation is performed on the workpiece. Such a gauge may comprise a plate 37, shown in FIGS. 2, 3 and 4, mounted on the base plate 1, preferably perpendicularly thereto, as clearly shown in FIGS. 3 and 4. For this purpose, the gauge plate 37 has a pair of spaced clamps 39 secured thereto in opposed relation by screws 41 which are threaded into the gauge plate 37, as clearly shown in FIG. 2. The clamps 39 embrace the base plate 1 along the opposite side edges thereof, the clamps having opposed jaws or ears 43 which overlap the upper surface of the base plate 1, and between which and the upper edge 45 of the gauge plate 37 the base plate 1 can be firmly clamped by tightening the screws 41 on the gauge plate 37 to force the jaws or ears firmly against the base plate upper surface, as shown. Upon loosening the screws 41, the gauge plate can be adjusted along the base plate between the front and rear edges thereof to locate the gauge plate in a desired position wherein, when the workpiece is placed thereagainst, the hole 35 thereof will be aligned properly with respect to the tool 29, as illustrated in FIG. 4. Once adjusted to the desired position, the gauge plate is locked in such position upon tightening of the screws 41.

In some cases, as when workpieces of large size are involved, the machine tool can be placed directly thereon and held in place by taking firm hold of the hand grip 7 and applying downward pressure. In other cases, the tool may be placed on the top T of a bench or work table and, if necessary, clamped thereto, the workpiece then being placed on the top surface of the base plate. Here, the gauge member may comprise an inverted U-shaped member slidably mounted on the upper surface of the base plate with its side arms engaging the side edges of the base plate and locked to the base plate by screws passing through such side arms of the U. In other cases, the tool can be clamped in a vise, for example, and the workpiece can be disposed against the lower surface of the base plate, as shown in FIGS. 2 and 4. Also, to insure even greater accuracy in locating the workpiece against the base with reference to the operating tool 29, a second gauge plate may be adjustably mounted on the gauge plate 37 at a right angle thereto and extending vertically thereon, to be adjustable longitudinally therealong (i.e., crosswise of the base plate 1). Thus, two right angularly related, adjustably mounted gauge plates are provided which will insure accurate location of the workpiece relative to the operating tool 29.

From the foregoing description, it will be apparent that there has been provided a very simple, hand operable machine tool for performing various cutting operations on a workpiece with great accuracy. Although only a single form of tool has been shown and described, it will, no doubt, be apparent that many other forms thereof, as well as variations ii that described herein, all coming within the spirit of this invention, are possible. Hence, it is desired that the foregoing shall be taken merely as illustrative and not in a limiting sense.

What is claimed is:

A manually operable thread tapping tool for cutting a thread in a workpiece, said tool comprising a base, a hand grip on said base, said hand grip including a portion overlying said base and terminating in a bearing member having a bore therein, an arbor mounted in said bore for free sliding and rotational movement therein, gauge means on said base for locating said workpiece in such a position that said hole is aligned with said tap, said gauge means comprising a plate member movably mounted on said base for adjustment thereon relative to said tap and against which said workpiece can be placed for accurate location thereof relative to said tap, means on said gauge plate for releasably locking said plate to said base in any position of adjustment thereon, said locking means comprising a pair of opposed clamps on said gauge plate which embrace said base along opposite edges thereof, said clamps including jaws in overlapping relation with one surface of said base and lock screws carried by said clamps and threaded into said gauge plate for tightening said jaws against said base surface when turned down thereagainst, crank means slidably carried by said arbor for rotating said arbor and tap while said tap is in engagement with said workpiece, and means releasably securing said crank means to said arbor in any position of adjustment thereof on said arbor.

References Cited by the Examiner

UNITED STATES PATENTS

| | | | |
|---|---|---|---|
| 112,861 | 3/1871 | Sprague | 83—468 X |
| 313,991 | 3/1885 | Coons | 83—467 |
| 695,980 | 3/1902 | Wilhelm | 10—129 X |
| 863,030 | 8/1907 | Johnson | 77—59 X |
| 1,270,823 | 7/1918 | Hoefle et al. | 83—468 |
| 1,395,353 | 11/1921 | Osterholm | 10—129 |
| 1,855,479 | 4/1932 | Gaudreau | 10—129 |
| 2,283,323 | 5/1942 | Erhardt. | |
| 2,345,450 | 3/1944 | Blanc | 83—468 |

WILLIAM S. LAWSON, *Primary Examiner.*

WILLIAM W. DYER, JR., *Examiner.*

F. T. YOST, *Assistant Examiner.*